US011088377B2

(12) United States Patent
Formanski et al.

(10) Patent No.: US 11,088,377 B2
(45) Date of Patent: Aug. 10, 2021

(54) METHOD FOR OPERATING A FUEL CELL SYSTEM

(71) Applicant: Bayerische Motoren Werke Aktiengesellschaft, Munich (DE)

(72) Inventors: Volker Formanski, Ismaning (DE); Maximilian Zettl, Oxnard, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 222 days.

(21) Appl. No.: 16/179,509

(22) Filed: Nov. 2, 2018

(65) Prior Publication Data

US 2019/0074530 A1 Mar. 7, 2019

Related U.S. Application Data

(63) Continuation of application No. PCT/EP2017/058022, filed on Apr. 4, 2017.

(30) Foreign Application Priority Data

May 4, 2016 (DE) ..................... 10 2016 207 806.2

(51) Int. Cl.
*H01M 8/04746* (2016.01)
*H01M 8/04089* (2016.01)
*H01M 8/04082* (2016.01)
*H01M 8/0438* (2016.01)

(52) U.S. Cl.
CPC ... *H01M 8/04753* (2013.01); *H01M 8/04089* (2013.01); *H01M 8/04201* (2013.01); *H01M 8/04395* (2013.01)

(58) Field of Classification Search
CPC ......... H01M 8/04089; H01M 8/04201; H01M 8/04395; H01M 8/04753; Y02E 60/50
See application file for complete search history.

(56) References Cited

U.S. PATENT DOCUMENTS

| 6,461,751 | B1* | 10/2002 | Boehm | ............. | H01M 8/04089 |
| | | | | | 429/432 |
| 8,765,316 | B2 | 7/2014 | Naganuma et al. | | |
| 8,927,168 | B2 | 1/2015 | Naganuma | | |
| 9,153,827 | B2 | 10/2015 | Bono | | |
| 2005/0233182 | A1 | 10/2005 | Fuss et al. | | |
| 2010/0159360 | A1* | 6/2010 | Stute | .................. | H01M 8/04111 |
| | | | | | 429/513 |
| 2011/0200896 | A1 | 8/2011 | Hasegawa et al. | | |
| 2012/0015270 | A1* | 1/2012 | Naganuma | ........ | H01M 8/04455 |
| | | | | | 429/432 |
| 2015/0288007 | A1 | 10/2015 | Gangwar et al. | | |

FOREIGN PATENT DOCUMENTS

| DE | 196 40 808 C1 | 11/1997 |
| DE | 197 01 390 C1 | 4/1998 |
| DE | 10 2005 018 070 A1 | 11/2005 |
| DE | 11 2008 002 749 T5 | 8/2010 |
| DE | 11 2009 005 098 T5 | 8/2012 |
| DE | 11 2010 005 520 T5 | 2/2013 |
| DE | 10 2015 103 981 A1 | 10/2015 |

OTHER PUBLICATIONS

PCT/EP2017/058022, International Search Report dated Jun. 7, 2017 (Two (2) pages).
German Search Report issued in German counterpart application No. 10 2016 207 806.2 dated Jan. 19, 2017, with Statement of Relevancy (Six (6) pages).

* cited by examiner

*Primary Examiner* — Anca Eoff
(74) *Attorney, Agent, or Firm* — Crowell & Moring LLP

(57) ABSTRACT

A method for operating a fuel cell system includes delivering an oxidant to at least one fuel cell by at least one oxidant delivery device where the stoichiometric ratio of the oxidant is modified on the basis of the delivery rate of the oxidant delivery device.

8 Claims, 1 Drawing Sheet

METHOD FOR OPERATING A FUEL CELL SYSTEM

CROSS REFERENCE TO RELATED APPLICATIONS

This application is a continuation of PCT International Application No. PCT/EP2017/058022, filed Apr. 4, 2017, which claims priority under 35 U.S.C. § 119 from German Patent Application No. 10 2016 207 806.2, filed May 4, 2016, the entire disclosures of which are herein expressly incorporated by reference.

BACKGROUND AND SUMMARY OF THE INVENTION

The technology disclosed herein relates to a method for operating a fuel cell system.

Fuel cell systems are operated generally with an approximately constant air factor λ. FIG. 1 shows the relation between the air mass flow rate ṁ of a compressor in a fuel cell system and the fuel cell system load. Plotted on the abscissa is the current I with which at least one fuel cell is loaded. Plotted on the ordinate is the delivery rate of oxidant that the compressor of the fuel cell system makes available to the fuel cell system in order to allow the fuel cell system to provide the current I or power P that is to be provided to the motor vehicle/consumer. Generally speaking, the compressor has a minimum speed. The minimum speed is associated with a minimum oxidant delivery rate $\dot{m}_{min}$, which is constant in the first, "low" load requirement range A. In the second load requirement range B, whose currents I or powers P to be provided are higher than those in the first load requirement range A, a delivery rate occurs, with the predetermined air factor λ, and increases in proportion with the currents I or powers P to be provided. The slope of the function shown schematically represents the air factor λ here. The air factor λ here is approximately constant. A third load requirement range C (function shown using dots) has higher currents I or powers P to be provided than the second load requirement range B. The required load of the load requirement ranges A, B, C is usefully a current I and/or a power P which the at least one fuel cell is intended to provide and/or with which the at least one fuel cell is loaded, respectively. In the third load requirement range C as well, the air factor λ is approximately constant. If the fuel cell system is intended to supply a very large current I or a very large power P within the third load requirement range C, then the maximum air mass flow rate $\dot{m}_{max}$ that the compressor can continuously deliver is exceeded. The compressor must therefore be operated in the overload range Üb in order to fulfil the load requirement. In the case of higher system loads it is possible for a time limit on the compressor loads to be stipulated, depending on the design of the compressor, in order to protect components. Operating the compressor above the maximum overload oxidant delivery rate $\dot{m}_{\ddot{u}b}$ is not permitted or not possible, even for a short time. Accordingly, the currents I to be provided here are also limited to $I_{\ddot{u}b}$ (and ultimately the power P to be provided as well). The compressor design therefore restricts the performance and continuous-load capacity of the fuel cell system as a whole.

Depending on the configuration of the system, the compressors are required to generate 1 to around 3 bar compressor pressure and to deliver comparatively high volume flow rates. The air compressor in the fuel cell system is the largest secondary consumer of the system and exerts a substantial influence over the system efficiency and the overall system power of the fuel cell system. The compressors used are also comparatively more expensive, despite substantial optimization of the components for use in a fuel cell system. Optimum design of the efficiency characteristic map and of the maximum power of the compressor to the defined load profile of the system is therefore essential.

A preferred object of the technology disclosed herein is to reduce or eliminate the disadvantages of the existing solutions. A preferred object more particularly is to propose a fuel cell system in which, with comparable manufacturing costs and comparable footprint, it is possible to deliver more power and/or to provide higher currents to the motor vehicle/consumer. Further preferred objects are apparent from the advantageous effects of the technology disclosed herein.

The technology disclosed herein relates to a method for operating a fuel cell system. A fuel cell system of this kind comprises at least one fuel cell. The fuel cell system is conceived, for example, for mobile applications such as motor vehicles, more particularly for providing the energy for at least one propulsion machine for the locomotion of the motor vehicle. In its simplest form, a fuel cell is an electrochemical energy converter which, while converting fuel and oxidant into reaction products, produces electricity and heat. The fuel cell comprises an anode and a cathode, which are separated by an ion-selective or ion-permeable separator. The anode comprises a supply for a fuel to the anode. Preferred fuels are as follows: hydrogen, low molecular mass alcohol, biofuels, or liquefied petroleum gas. The cathode comprises, for example, a supply for oxidants. Examples of preferred oxidants are air, oxygen, and peroxides. The ion-selective separator may be designed, for example, as a proton exchange membrane (PEM). A cation-selective polymer electrolyte membrane is preferably employed. Examples of materials for such a membrane are as follows: Nafion®, Flemion®, and Aciplex®. A fuel cell system comprises at least one fuel cell and also peripheral system components (BOP components) which may be employed in the operation of at least one fuel cell. Generally speaking, a plurality of fuel cells are assembled to form a fuel cell stack.

In accordance with the method disclosed herein, the oxidant is delivered by at least one oxidant delivery means to at least one fuel cell. The oxidant delivery means may be designed, for example, as a compressor, more preferably as an air-suspended turbocompressor or centrifugal compressor. The oxidant delivery means preferably has an operating speed range of around 15,000 rpm to around 170,000 rpm, and more preferably of around 25,000 rpm to around 130,000 rpm. The oxidant delivery means is in fluid communication with the cathode of the at least one fuel cell.

In accordance with the method disclosed herein, the stoichiometric ratio X of the oxidant is altered, thereby advantageously preserving or protecting the oxidant delivery means.

The stoichiometric ratio λ of the oxidant indicates the factor by which more oxidant is provided than is actually needed for the reaction at the cathode. If air is the oxidant used, it may also be referred to as the air ratio λ or air factor λ. The air ratio λ places the air mass $m_{L\text{-}tats}$ actually available for the electrochemical reaction in the at least one fuel cell into relation with the minimum necessary stoichiometric air mass $m_{L\text{-}st}$ which is required for complete electrochemical reaction in the at least one fuel cell. The relation is therefore as follows:

$$\lambda = \frac{m_{L-tats}}{m_{L-st}}, \quad (1)$$

The stoichiometric ratio λ of the fuel cell system is therefore changed so that the compressor is not damaged. Existing systems, however, do not provide any operating method for a fuel cell system in which the oxidant stoichiometry is altered for this purpose. Instead, the stoichiometric ratio λ is oftentimes constant over the entire load requirement range of existing fuel cell systems (cf. FIG. 1).

The current I or fuel cell current I (these terms may be regarded as synonyms) to be provided in the fuel cell system is in this case the current I with which the at least one fuel cell or the fuel cell stack of the fuel cell system is loaded by consumers (of the motor vehicle). For example, this current I may be required by at least one consumer on the high-voltage bus of the propulsion system. Analogously, the power P or fuel cell power P (these terms are likewise used here as synonyms) to be provided is the power P which the at least one fuel cell of the fuel cell system is required to provide to at least one consumer, generally speaking a consumer of the high-voltage bus system. In this context, at least one control facility may generate a corresponding control signal for the fuel cell system. The fuel cell power P is dictated by the fuel cell current I and the voltage of the at least one fuel cell.

Depending on design, any consumers of the fuel cell system itself (e.g., the oxidant delivery means) are included among the consumers of the high-voltage bus system or among internal consumers of the fuel cell system. In that case, such internal consumers would have to be taken into account in the context of the fuel cell current I to be provided and, respectively, in the context of the fuel cell power P to be provided.

The technology disclosed here relates to a method whereby the stoichiometric ratio λ of the oxidant is altered when the oxidant delivery means has attained at least 80% or at least 90% or around 100% of its maximum delivery rate $\dot{m}_{max}$ for the continuous operation of the oxidant delivery means. With particular preference, the oxidant delivery means here delivers the oxidant at the maximum delivery rate. The delivery rate ṁ indicates the quantity of oxidant delivered by the oxidant delivery means per unit time. For this purpose, for example, the volume flow rate and/or the mass flow rate of oxidant can be employed. If air is the oxidant, preference is given to using the air mass flow rate ṁ, in other words the mass of air delivered within a unit time. Oxidant delivery means generally have a maximum delivery rate with which they are able to deliver oxidant permanently, in other words without temporal limitation, without damage to the oxidant delivery means, and more particularly to its drive motor. This maximum delivery rate is the maximum delivery rate for continuous operation. In this continuous operation, the components of the oxidant delivery means (e.g., electric motor, inverter, etc.) do not suffer thermal overloading. The maximum delivery rate for continuous operation is stipulated by the manufacturer of the oxidant delivery means or is determined by tests.

Generally speaking, the oxidant delivery means are designed to carry out short-term delivery of delivery rates higher than the maximum delivery rate for continuous operation. If the oxidant delivery means had to deliver such overload delivery rates continuously, its components (e.g., electric motor, inverter, etc.) would suffer thermal overload and ultimately would be damaged. There is a temporal limit on this overload capacity on the part of the oxidant delivery means, which is dependent on the height, the duration, and the frequency of the overloading.

The technology disclosed here relates to a method whereby, for the purpose of protecting the oxidant delivery means, the stoichiometric ratio λ is reduced in such a way that the at least one fuel cell of the fuel cell system provides a fuel cell current I that is to be provided and/or a fuel cell power P that is to be provided, without the oxidant delivery means delivering, or having to deliver, oxidant at a delivery rate above the maximum delivery rate. With particular preference the oxidant delivery means for this purpose delivers oxidant at the maximum delivery rate.

The technology disclosed here relates to a method whereby the oxidant delivery means delivers oxidant at a delivery rate above the maximum delivery rate when the value of the stoichiometric ratio λ of the oxidant has reached or fallen below a lower limiting value for the stoichiometric ratio $\lambda_{grenz}$ and the oxidant delivery means is already delivering oxidant at maximum delivery rate. The technology disclosed here relates in particular to a method whereby the oxidant delivery means delivers oxidant at a delivery rate above the maximum delivery rate only for a timespan which is shorter than a maximum permissible timespan for the oxidant delivery means. The maximum permissible timespan here is usefully the timespan permitted by the manufacturer for overload operation.

Generally speaking, a fuel cell system can be operated in a system-specific range for the stoichiometric ratio λ.

For example, the system may be designed for operation with a stoichiometric ratio λ of around 1.2 to 2.0, preferably between 1.5 and 1.7. If, then, the stoichiometric ratio $\lambda_{grenz}$ reaches or falls below a lower limit value—because, for example, a further-increased flow I and/or a further-increased power PI to be provided would necessitate a further reduction in the stoichiometric ratio λ so that the maximum delivery rate $\dot{m}_{max}$ of the oxidant delivery means in continuous operation would not be exceeded—provision may be made for the control facility briefly actually to allow overload operation of the oxidant delivery means, so that ultimately the fuel cell system can continue to be operated within the system-specific range for the stoichiometric ratio λ.

The technology disclosed here further relates to a control facility for the operation of a fuel cell system, wherein the control facility is configured to perform one or more of the methods disclosed herein. The control facility may be adapted to deliver oxidant by at least one oxidant delivery means to at least one fuel cell. Further, the control facility may be adapted to change the stoichiometric ratio (λ) of the oxidant when the oxidant delivery means has reached at least 80% or at least 90% or at least 100% of its maximum delivery rate ($\dot{m}_{max}$) in continuous operation.

In other words, with the technology disclosed here, the continuous-load capacity of the oxidant delivery means is likewise taken into account. In the operating strategy of the fuel cell system, however, a correspondingly reduced air factor λ is taken into account for a defined range, dependent in particular on fuel cell voltage and on the system efficiency, in the context of increasing load. Through this adaptation of the operating strategy, the air mass flow rate remains at a constant level (in accordance with the continuous-load capacity of the compressor) in spite of a further increase in the fuel cell system load. The effect of lowering the air factor λ is generally to decrease the fuel cell voltage and hence to reduce the system efficiency. Through this measure, nevertheless, an increase in the system load is possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
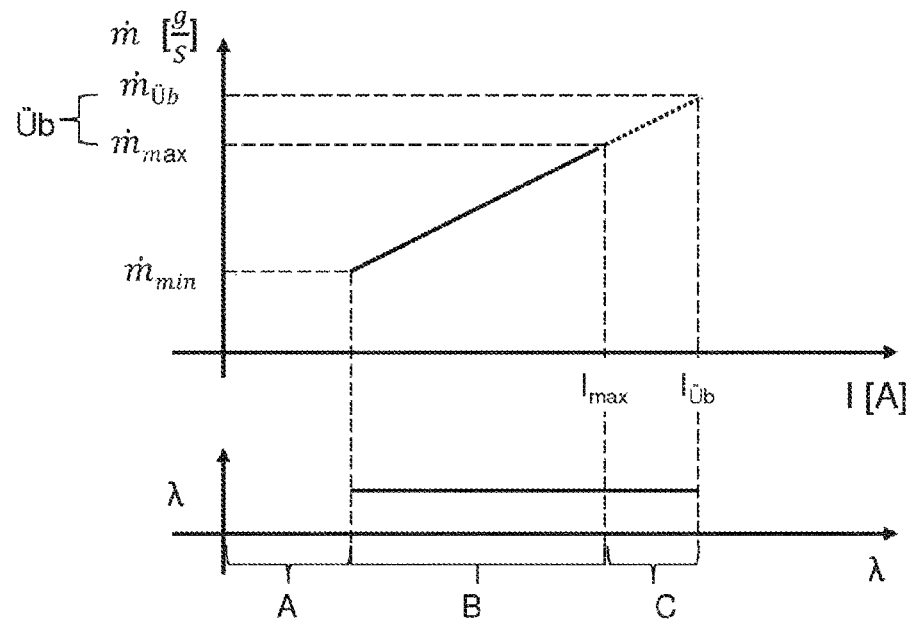
FIG. 1 shows the relation between the air mass flow rate of a compressor in a fuel cell system and the fuel cell system load of the prior art.
Figure 2:
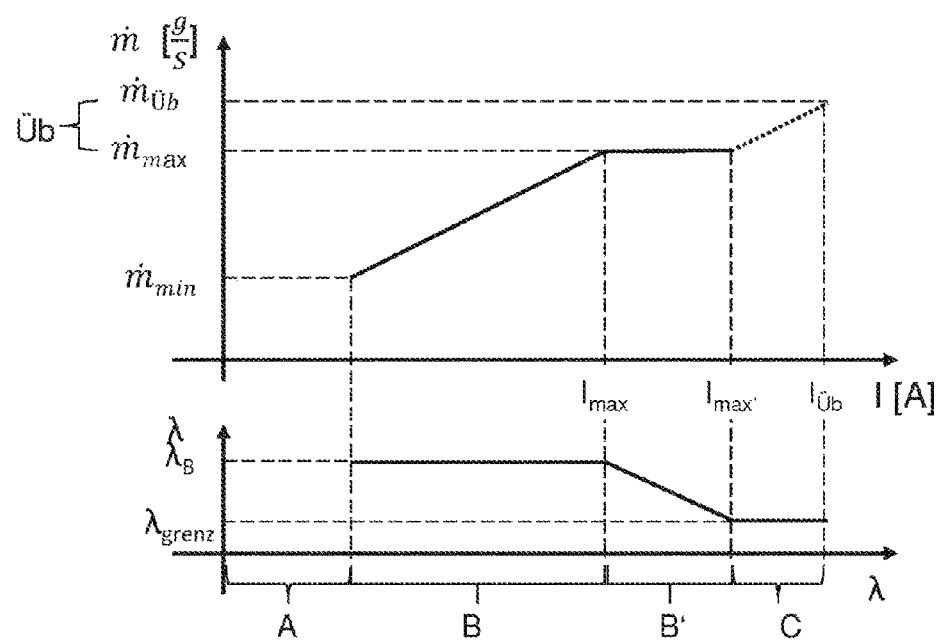
FIG. 2 shows the relation between the air mass flow rate of a compressor in a fuel cell system and the fuel cell system load in accordance with the principles of the present invention.

The technology disclosed here is now elucidated with reference to the diagrammatic FIG. 2. In the second load requirement range B, as in the case of FIG. 1, the fuel cell system is operated with constant or approximately constant stoichiometric ratio $\lambda_B$. With increasing fuel cell current I to be provided by the at least one fuel cell, there is likewise an increase in the delivery rate of the oxidant delivery means, until the oxidant delivery means is operated at maximum delivery rate $\dot{m}_{max}$. If, then, the current I to be provided by the fuel cells increases to a level above $I_{max}$, then the control facility intervenes in such a way that the stoichiometric ratio $\lambda$ is reduced. This, in FIG. 2, is the region B', in which the stoichiometric ratio $\lambda$ here decreases linearly, starting from the stoichiometric ratio $\lambda_B$ in the second load requirement range B until a lower limit value $\lambda_{grenz}$ for the stoichiometric ratio is reached. This lower limit value $\lambda_{grenz}$ is selected such that the fuel cell system can still be operated safely and efficiently at a stoichiometric ratio above the limit value $\lambda_{grenz}$.

The efficiency of the at least one fuel cell could be lower within this range B' than the efficiency of the fuel cell at the stoichiometric ratio $\lambda_B$ in the second load requirement range B. This poorer efficiency, however, would be accepted for safe continuous-load operation of the oxidant delivery means at higher load points.

The overload operation of the oxidant delivery means is usefully shifted in FIG. 2 to higher load requirement ranges. If the same oxidant delivery means are used in the examples according to FIG. 1 and FIG. 2 it is possible advantageously in the example of FIG. 2 for the overload region Üb (that is, operation of the oxidant delivery means with overload) to be delayed until the maximum fuel cell power $I_{max'}$ to be provided. It is therefore possible to provide more fuel cell power from a system with given oxidant delivery means.

In FIGS. 1 and 2, the technology disclosed here is described with reference to the fuel cell current I to be provided by the at least one fuel cell. The circumstances detailed for the fuel cell current I are equally valid as well for the fuel cell power P to be provided by the at least one fuel cell.

The foregoing description of the present invention is given only for illustration and not for restricting the invention. Within the bounds of the invention there are various alterations and modifications possible without departing the scope of the invention and of its equivalents.

LIST OF REFERENCE CHARACTERS

Overload region Üb
Maximum overload oxidant delivery rate $\dot{m}_{üb}$
First load requirement range A
Second load requirement range B
Third load requirement range C
Current to be provided by the fuel cells I
Maximum current to be provided $I_{max}$, $I_{max'}$
Maximum delivery rate in continuous operation $\dot{m}_{max}$
Minimum oxidant delivery rate $\dot{m}_{min}$
Stoichiometric ratio $\lambda$
Stoichiometric ratio, load requirement range B $\lambda_B$
Lower limit value for the stoichiometric ratio $\lambda_{grenz}$ The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a fuel cell system, comprising the acts of:
   delivering an oxidant by an oxidant delivery means to a fuel cell;
   altering a stoichiometric ratio of the oxidant when the oxidant delivery means has substantially reached a maximum delivery rate below an overload delivery rate range; and
   operating the oxidant delivery means below the overload delivery rate range in accordance with the altered stoichiometric ratio of the oxidant.

2. The method as claimed in claim 1, wherein the stoichiometric ratio is reduced such that the fuel cell provides a fuel cell current that is to be provided and/or a fuel cell power that is to be provided without the oxidant delivery means delivering the oxidant at a delivery rate above the maximum delivery rate.

3. The method as claimed in claim 1, wherein the oxidant delivery means delivers the oxidant at a delivery rate above the maximum delivery rate when a value of the stoichiometric ratio of the oxidant has reached or exceeded a lower limiting value for the stoichiometric ratio.

4. The method as claimed in claim 3, wherein the oxidant delivery means delivers the oxidant at the delivery rate above the maximum delivery rate only for a timespan which is shorter than a maximum permissible timespan for the oxidant delivery means.

5. An apparatus for operating a fuel cell system, comprising:
   an oxidant delivery means, configured to deliver an oxidant to the fuel cell; and
   a control facility, configured to:
      alter a stoichiometric ratio of the oxidant when the oxidant delivery means has substantially reached a maximum delivery rate below an overload delivery rate range, and
      operate the oxidant delivery means below the overload delivery rate range in accordance with the altered stoichiometric ratio of the oxidant.

6. The apparatus as claimed in claim 5, wherein the control facility is configured to reduce the stoichiometric ratio such that the fuel cell provides a fuel cell current that is to be provided and/or a fuel cell power that is to be provided without the oxidant delivery means delivering the oxidant at a delivery rate above the maximum delivery rate.

7. The apparatus as claimed in claim 5, wherein the control facility is configured to control the oxidant delivery means such that the oxidant is delivered at a delivery rate above the maximum delivery rate when a value of the stoichiometric ratio of the oxidant has reached or exceeded a lower limiting value for the stoichiometric ratio.

8. The apparatus as claimed in claim 7, wherein the control facility is configured to control the oxidant delivery means such that the oxidant is delivered at the delivery rate above the maximum delivery rate only for a timespan which is shorter than a maximum permissible timespan for the oxidant delivery means.

\* \* \* \* \*